United States Patent [19]

Kenison

[11] Patent Number: 4,821,450
[45] Date of Patent: Apr. 18, 1989

[54] NO SPRAY LIVE SKUNK TRAP APPARATUS

[76] Inventor: Walter D. Kenison, Carefree Living, Apartment 1, Pioche, Nev. 89043

[21] Appl. No.: 233,176

[22] Filed: Aug. 16, 1988

[51] Int. Cl.⁴ .................................... A01M 23/02
[52] U.S. Cl. ................................................ 43/61
[58] Field of Search ................................ 43/61, 60

[56] References Cited

U.S. PATENT DOCUMENTS

| | | |
|---|---|---|
| 86,175 | 1/1869 | Merritt et al. |
| 3,975,857 | 8/1976 | Branson .................................. 43/61 |
| 4,144,667 | 3/1979 | Souza ..................................... 43/61 |
| 4,232,472 | 11/1980 | Muelling ................................ 43/61 |
| 4,452,004 | 6/1984 | Matsuura ............................... 43/61 |
| 4,557,067 | 12/1985 | Ha ......................................... 43/61 |
| 4,578,892 | 4/1986 | Melton ................................... 43/60 |
| 4,590,703 | 5/1986 | Cutter .................................... 43/61 |
| 4,590,704 | 5/1986 | Volk ...................................... 43/61 |

Primary Examiner—Gene P. Crosby
Attorney, Agent, or Firm—Henderson & Sturm

[57] ABSTRACT

A no spray live skunk trapping apparatus (10) including a telescoping housing unit (11) which can be retracted to force the skunk into the covered housing section (15) of the trapping apparatus (10); such that the skunk will be prevented from spraying a trapper while the skunk is held captive within the confines of the trapping apparatus.

8 Claims, 1 Drawing Sheet

NO SPRAY LIVE SKUNK TRAP APPARATUS

TECHNICAL FIELD

The present invention relates to live animal traps in general and more specifically to a live trap for skunks that will contain the skunks spray discharge in a confined area.

BACKGROUND OF THE INVENTION

The present invention was the subject matter of Document Disclosure Program Registration No. 188,937 which was filed in the U.S. Patent and Trademark Office on Mar. 21, 1988.

As can be seen by reference to the following U.S. Pat. Nos.: 4,590,703; 4,590,704; 4,578,892 and 86,175 the prior art is replete with myriad and diverse live animal trap devices.

While all of the aforementioned prior art constructions are more than adequate for the basic purpose and function for which they have been specifically designed, these structures are severely deficient when it comes to trapping skunks for a variety of reasons.

To begin with, skunks will normally not enter a completely dark enclosure such as is depicted in U.S. Pat. No. 4,578,892; however, a skunk shows little reluctance to enter a partially opaque trap wherein the trap device appears to be open on both ends.

Furthermore, in totally opaque trap constructions it is virtually impossible to tell whether or not a skunk is actually present in the trap when the trap is closed; and, there may even be situations with some of the potential devices wherein the skunk is actually present in the trap but not visible while the trap door is still open, but the skunk has not progressed far enough into the trap interior to trip the trap door latching mechanism.

In addition, in those instances wherein an open wire framework comprises the trap housing, it does not require a vivid imagination to foresee the problems of even approaching the trapped skunk no less actually transporting the polecat from the location where the animal was actually captured.

As a consequence of the foregoing situation there has existed a longstanding need among individuals who are interested in trapping skunks at one location and releasing the animals unharmed at another location, for a live trap construction that will minimize to the greatest extent feasible the possibility of the trapper receiving an unwanted dosage of skunk essence. The provision of such a no spray live skunk trapping apparatus being the stated purpose and objective of the present invention.

SUMMARY OF THE INVENTION

Briefly stated, the no spray live skunk trapping apparatus that forms the basis of the present invention comprises in general: a telescoping trap housing unit; a mechanical trap unit; and a trap locking unit.

The telescoping trap housing unit comprises a generally open and a generally closed trap housing section which are telescoped outwardly prior to the skunk entering the trap apparatus; and which are adapted to be collapsed inwardly relative to one another to force the skunk into the closed section of the trap housing unit. This cooperation between the open and closed sections of the trap housing unit is one of the key features of this invention; in that the slow and careful retraction of the housing sections forces the skunk backwards into the closed section whereby the likelihood of the trapper being sprayed by the skunk is substantially diminished.

The mechanical trap unit comprises a trap door operatively connected to the outer end of the closed section of the housing unit wherein the trap door is attached to a trip mechanism positioned proximate the juncture of the closed section and the open section of the trap housing unit whereby the skunk will be required to travel a substantial distance within the confines of the trap prior to the trip mechanism being actuated.

The trap locking unit comprises a gravity operated lock member that is operatively associated with the trip mechanism and positioned proximate to the interior surface of the trap door; wherein, the lock member will fall behind the closed trap door and enter an aperture in the floor of the closed section of the trap housing unit such that the lock member is disposed adjacent the rear surface of the trap door in the locked position.

BRIEF DESCRIPTION OF THE DRAWINGS

These and other objects, advantages, and novel features of the invention will become apparent from the detailed description of the best mode for carrying out the preferred embodiment of the invention which follows; particularly when considered in conjunction with the accompanying drawings, wherein.

BEST MODE FOR CARRYING OUT THE INVENTION

Figure 1:
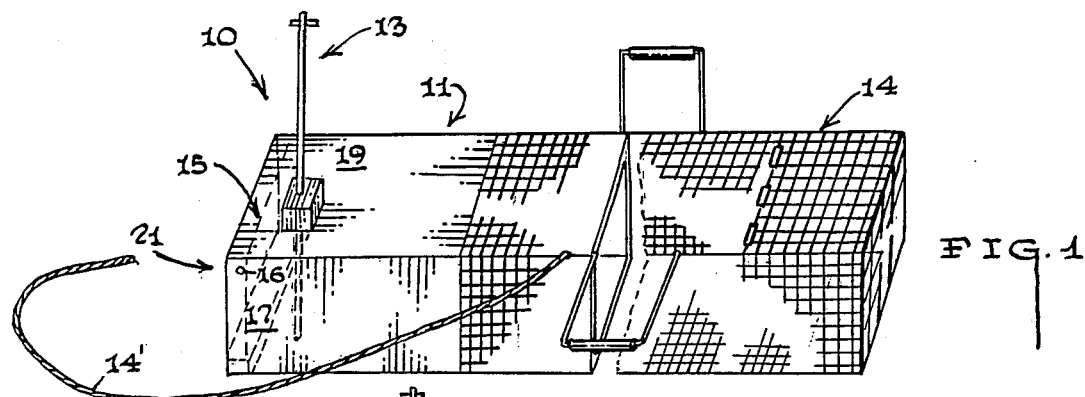
FIG. 1 is a perspective view of the live skunk trapping apparatus of this invention.
Figure 2:
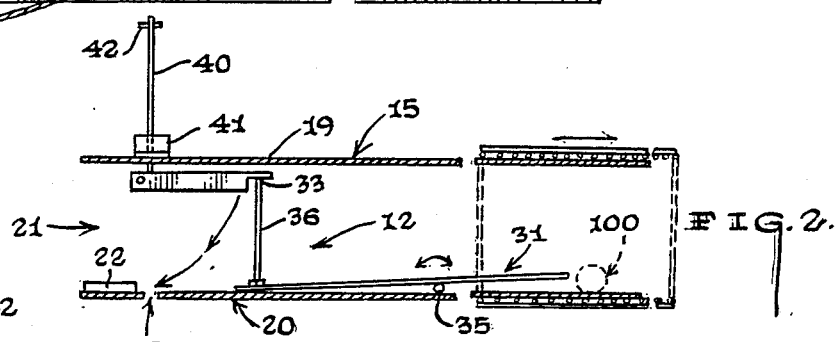
FIG. 2 is a cross-sectional view of the apparatus.

As can be seen by reference to the drawings and in particular to FIGS. 1 and 2, the no spray live skunk trapping apparatus that forms the basis of the present invention is designated generally by the reference numeral (10). The live trapping apparatus (10) comprises in general: a telescoping trap housing unit (11); a mechanical trap unit (12); and, a trap locking unit (13). These units will now be described in seriatim fashion.

As can best be appreciated by reference to FIGS. 1 and 2, the telescoping trap housing unit (11) comprises a generally rectangular open framework housing section (14) and a generally rectangular covered housing section (15); wherein, the two housing sections (14) and (15) are relatively movable with respect to one another, to expand and contract the effective length of the trap housing unit (11). In addition, as shown in FIG. 2 the outer open framework housing section (14) slides over the inner covered housing section (15) and is also provided with an elongated tether (14') for reasons that will be explained further on in the specification.

Figure 3:
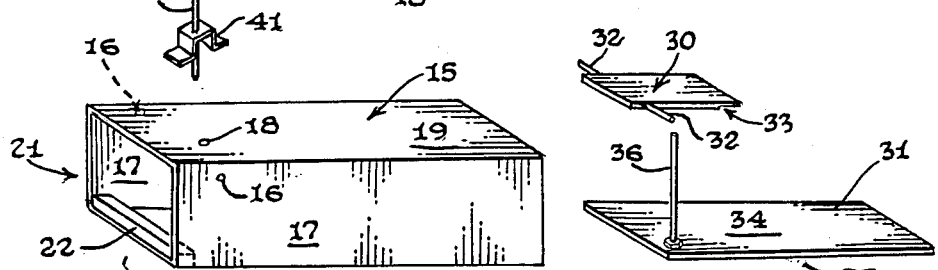
FIG. 3 is an exploded perspective view of the apparatus.
Figure 3:
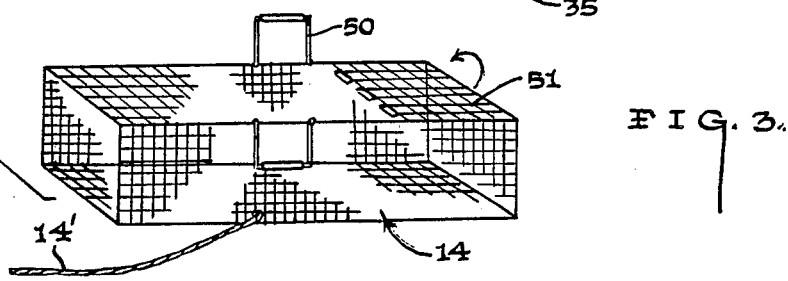

Furthermore, as shown in FIGS. 1 thru 3, the covered housing section (15) is provided with a pair of horizontally aligned discrete apertures (16) disposed on the sides (17) of the covered housing section (15) as well as a pair of vertically aligned discrete apertures (18) disposed in both the top (19) and bottom (20) of the covered housing section (15). Also the mouth (21) of the trap housing unit (11) is further provided with a stop element (22) whose purpose and function will be explained presently.

Turning now particularly to FIGS. 2 and 3, it can be seen that the mechanical trap unit (12) comprises in general: a trap door member (30); and a trap tripping member (31) which are disposed substantially within the covered housing section (15) of the telescoping housing unit (11).

The trap door member (30) is pivotally secured to the covered housing section (15) via a pair of outwardly projecting pin elements (32) which are dimensioned to be received in the horizontally aligned discrete apertures (16) in the sides (17) of the covered housing section (15); such that the trap door member (30) will be vertically suspended within the covered housing section at a location adjacent the stop element (32). In addition, the trap door member (30) is further provided with a shallow recessed portion (33) proximate its free end; wherein the recessed portion (33) is operatively connected to the trap tripping member (31).

The trap tripping member (31) comprises a treadle plate (34) having a rocking bar (35) disposed beneath the mid-point of the treadle plate (34); and, a trip arm (36) projecting upwardly from a location proximate one of the forward corners of the treadle plate (34); wherein, the upper end of the trip arm (36) is dimensioned to be received in the shallow recessed portion (33) of the trap door (30) when the trap door is in its horizontally disposed set position.

The trap locking unit (13) comprises an elongated thin locking bar (40) supported in an apertured bracket (41) which is disposed on the top (19) of the covered housing section (15); wherein the longitudinal axis of the locking bar (40) is aligned with the vertically aligned apertures (18) in the top (19) and bottom (20) of the covered housing section. In addition, the locking bar (40) is further provided with a cross-piece element (42) which will limit the downward travel of the locking bar (40) relative to both the apertured bracket (41) and the covered housing section (15).

Figure 4:
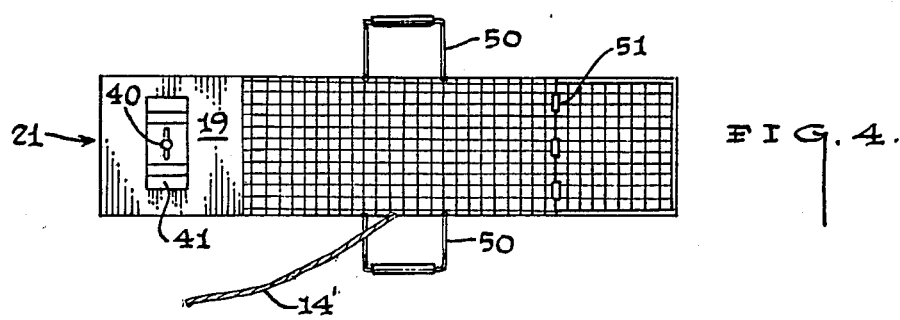
FIG. 4 is a top plan view of the apparatus.

As can best be seen by reference to FIGS. 3 and 4, the open framework housing section (14) of the trapping apparatus (10) is provided with a plurality of handle members (50) and at least one hinged gate member (50) that is disposed proximate the far end of the open framework housing section (14), both for the introduction of bait (100) shown in phantom in FIG. 2, into the far end of the framework housing section (14) and also to allow the trapped skunk (not shown) to escape when the apparatus (10) has been removed to a remote location.

At this juncture it should be appreciated that the operation of the live skunk trapping apparatus proceeds in the following manner. First of all the trap apparatus is deployed at a suitable location and the telescoping housing unit is extended to its full length; whereupon, skunk bait (100) is introduced into the far end of the open framework section (14) of the apparatus (10) through the hinged framework panel (51).

At this point the locking bar (42) is elevated as depicted in FIGS. 1 thru 3, so that the trap door (30) may be pivoted upwardly to its horizontally disposed trap set position. The treadle plate (34) is then rotated in a counterclockwise direction to place the trip arm (36) beneath the shallow recess (33) in the trap door (30); and, the locking bar (40) is lowered into contact with the upper surface of the trap door.

Now when a skunk enters through the mouth (21) of the apparatus (10) it is necessary for the skunk to traverse the treadle plate (34) to reach the bait (100). Once the center of gravity of the skunk passes over the rocking bar (35) the treadle plate (34) will rotate in a clockwise direction.

This clockwise rotation of the treadle plate (34) will cause the trip arm (36) to be disengaged from the shallow recess in the trap door (30) allowing the trap door (30) to fall by gravity against the back of the stop element (22). Simultaneously, the locking bar (40) will also be falling by gravity into the engagement with the lower vertically aligned aperture (18) in the bottom (20) of the covered housing section (15) of the apparatus (10) to capture the skunk.

Once the skunk is held captive in the trap apparatus (10) the telescoping housing unit (11) can be retracted by grasping the tether (14') to slide the open framework housing section (14) back over the covered housing section (15) to force the skunk into confinement in the covered housing section (15).

With the skunk safely confined within the covered housing section (15) and unable to spray the trapper, the trapper can then grasp the carrying handles (50) of the apparatus (10) to transport the skunk to a remote location for eventual release.

Having thereby described the subject matter of this invention it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A live skunk trapping apparatus for minimizing the possibility that the trapper will be sprayed by a captured skunk wherein the trapping apparatus comprises:
   a telescoping housing unit including a generally rectangular covered housing section and a generally rectangular open framework housing section wherein one of said housing sections is dimensioned to slide over the outside of the other of said housing sections; and,
   a mechanical trap unit operatively connected within said telescoping trap housing unit and including a trap door member pivotally suspended within said trap housing unit.

2. The apparatus as in claim 1 further comprising:
   a trap locking unit operatively associated with both the telescoping trap housing unit and the mechanical trap unit for disabling said trap door in the trap activated position.

3. The apparatus as in claim 2 wherein said mechanical trap unit further comprises:
   a trap tripping member comprising a treadle plate having a rocking bar disposed beneath the midpoint of the treadle plate and a trip arm projecting upwardly from one of the corners of the treadle plate; wherein, the trip arm is dimensioned to releasably support the trap door member in a generally horizontal trap set position.

4. The apparatus as in claim 3 wherein the covered housing section has a pair of vertically aligned apertures in the top and bottom of said covered housing section.

5. The apparatus as in claim 4 wherein the trap locking unit comprises:
   a locking bar supported in an apertured bracket wherein the longitudinal axis of the locking bar is aligned with the vertically aligned apertures in said covered housing section.

6. The apparatus as in claim 5 wherein the covered housing section is further provided with a stop element that will limit the pivotal movement of the trap door member.

7. The apparatus as in claim 6 wherein the vertically aligned apertures in the covered housing section are disposed inwardly from both the pivotal connection between the trap door member and the open framework housing section as well as the location of the stop element relative to the open framework housing section.

8. The apparatus as in claim 7 wherein the upper end of the locking bar is provided with a cross-piece element which will limit the downward travel of the locking bar relative to the apertured bracket and the covered housing section.

* * * * *